Sept. 23, 1930.  S. COVELLO  1,776,348
CAKE MIXER
Filed Jan. 3, 1930
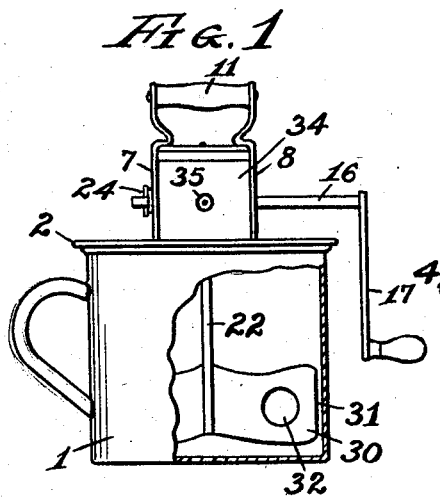
Fig. 1
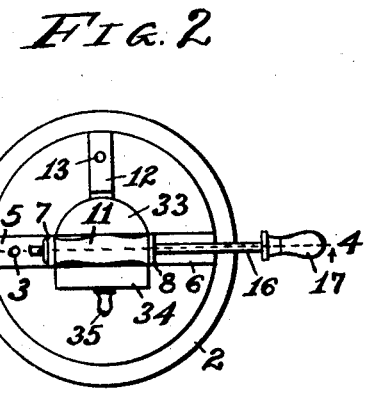
Fig. 2
Fig. 3
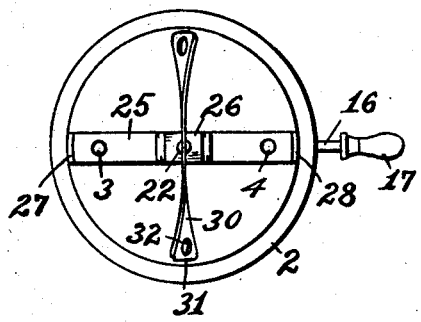
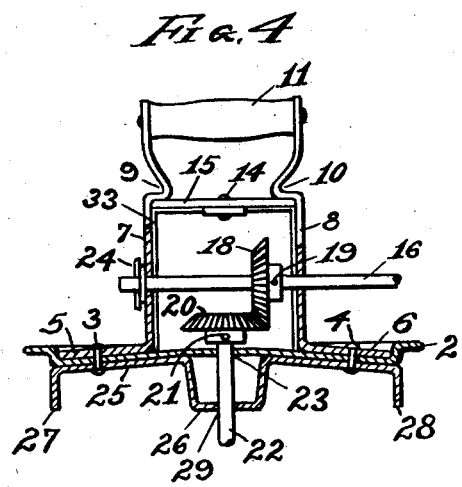
Fig. 4
Fig. 5
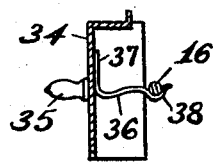
Inventor
S. Covello
By G. E. Dunstan,
his Attorney Patented Sept. 23, 1930

1,776,348

UNITED STATES PATENT OFFICE

SABATINO COVELLO, OF CLEVELAND, OHIO

CAKE MIXER

Application filed January 3, 1930. Serial No. 418,231.

This invention relates to cake mixers, and has for its principal object to provide a cake mixer, which is adapted to mix the batter and ingredients contained therein for the making of a cake with a minimum of labor.

Another object of the invention is to provide a cake mixer consisting of a conveniently portable unit, adapted to be applied to a receptacle containing the batter.

Another object of the invention is to provide a cake mixer of said character which is of simple and practical construction, is readily applied to a receptacle and will rest firmly thereupon, and is easily operated.

With the above and other objects in view the invention will be hereinafter fully described as illustrated in the accompanying drawings, and the novel features thereof will be distinctly pointed out in the appended claims.

In the several views of the drawings, similar characters of reference are used to designate corresponding parts.

Figure 1 is a side elevation of a cake mixer constructed in accordance with my invention, Fig. 2 is a plan view thereof, Fig. 3 is a bottom plan view of the cake mixing unit, Fig. 4 is a sectional elevation, on an enlarged scale, of the mixing unit, taken on line 4—4 of Fig. 2, and Fig. 5 is a cross sectional view of the gear and pinion enclosing door illustrating the same held in closed position.

Referring to the drawings, 1 represents a receptacle adapted to contain batter to be thoroughly mixed for the making of a cake or the like, and a lid or cover 2 is provided for closing the open top of said receptacle. This invention consists of fixing to the cover 2, operating mechanism now to be described.

Fixed to the cover 2 by rivets 3 and 4 are the oppositely extending feet 5 and 6 of upright bars 7 and 8, which are bent inwardly at 9 and 10, and fixed between the upper ends thereof is a horizontal handle 11. An upright brace 12 for the upright bars 7 and 8 is fixed at 13 to the cover 2 and at 14 to a cross bar 15 extending between and fixed to said bars in any suitable manner. Rotatably mounted in the upright bars 7 and 8 is a horizontal shaft 16 having a suitable crank handle 17 fixed thereto. A suitable gear 18 is fixed at 19 to the shaft 16 for engaging a pinion 20 fixed at 21 to the upper end of a vertical rod 22, which passes through a central opening 23 of the cover 2. Longitudinal movement of the shaft 16 is prevented by the gear 18 engaging the pinion 20 and a washer and a cotter pin at 24.

Fixed to the inner side of the cover 2 by means of the before mentioned rivets 3 and 4 is a bar 25 having a depending yoke center 26 and downwardly turned end lugs 27 and 28, which are adapted to fit into and engage the sides of the receptacle 1 for holding said cover rigidly and securely thereon. The yoke 26 is provided with an opening at 29 for the vertical rod 22, and said yoke serves as a bearing and also a guide for said rod. A suitable paddle 30, preferably of sufficient width to leave but slight clearance between its vertical edges 31 and the inside of the receptacle 1, and having openings 32 therethrough, is fixed to the lower end of the rod 22.

For enclosing the gear 18 and the pinion 20, a casing 33 is fixed to the upright bars 7 and 8 and the brace 12 and the cross bar 15. The front and open end of the casing 33 is closed by a removable door 34 constructed of sheet metal and having a knob 35. A pair of wire spring members, as shown at 36, fixed at 37 to the door 34 near each side thereof and having upturned free ends 38 adapted to engage the horizontal shaft 16, are provided for holding said door in position.

From the drawings and description, it will be apparent that such a cake mixing unit is efficient, is operated with a minimum of labor, may be readily applied to a receptacle and will be securely supported thereon.

Having fully described my invention, what I claim is:

1. In a cake mixer, the combination of a cover, upright bars fixed to the top of the cover, a handle fixed between said upright bars, a horizontal shaft rotatably mounted in said upright bars, a gear fixed to said shaft between said upright bars, a crank fixed to said horizontal shaft, a vertical rod rotatably mounted in said cover, a pinion fixed to said rod and engaged by said gear, a paddle fixed to said rod, a casing fixed to said upright bars enclosing the rear sides of said gear and pinion, a removable door enclosing the forward side of said gear and pinion, and means adapted to engage said horizontal shaft for retaining said door in closed position.

2. In a cake mixer, the combination of a cover, upright bars fixed to the top of the cover, a handle fixed between said upright bars, a horizontal shaft rotatably mounted in said upright bars, a gear fixed to said shaft between said upright bars, a crank fixed to said horizontal shaft, a vertical rod rotatably mounted in said cover, a pinion fixed to said rod and engaged by said gear, a paddle fixed to said rod, a casing fixed to said upright bars enclosing the rear sides of said gear and pinion, a removable door enclosing the forward side of said gear and pinion, springs extending from said door and the springs having upturned free ends adapted to engage said horizontal shaft for retaining said door in closed position.

In testimony whereof I affix my signature.

SABATINO COVELLO.